Figure 4:
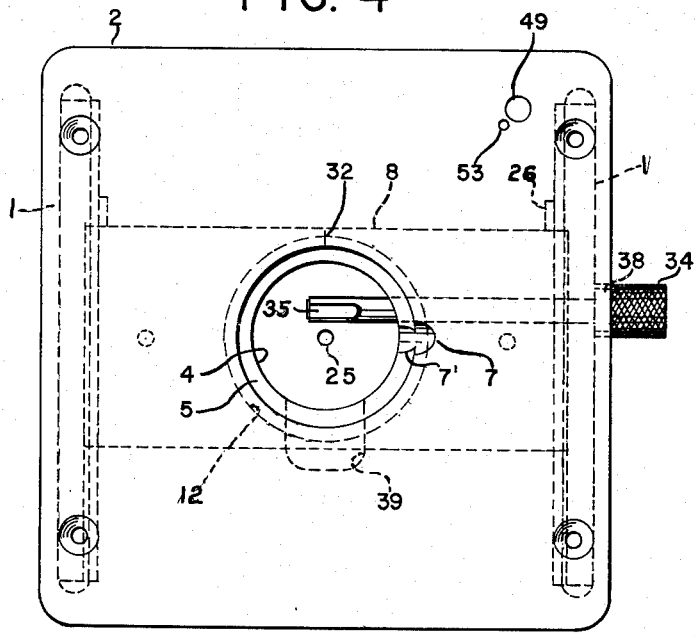

Dec. 24, 1963  B. B. JOFFE ETAL  3,115,577
MEASURING TABLE FOR USE IN COATING THICKNESS MEASURING
Filed May 3, 1962  2 Sheets-Sheet 1
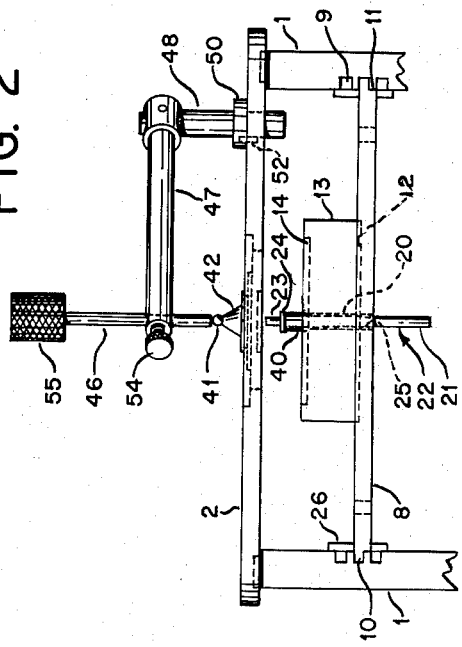
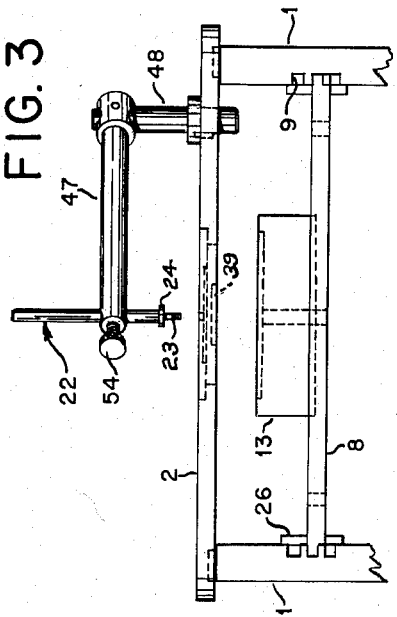
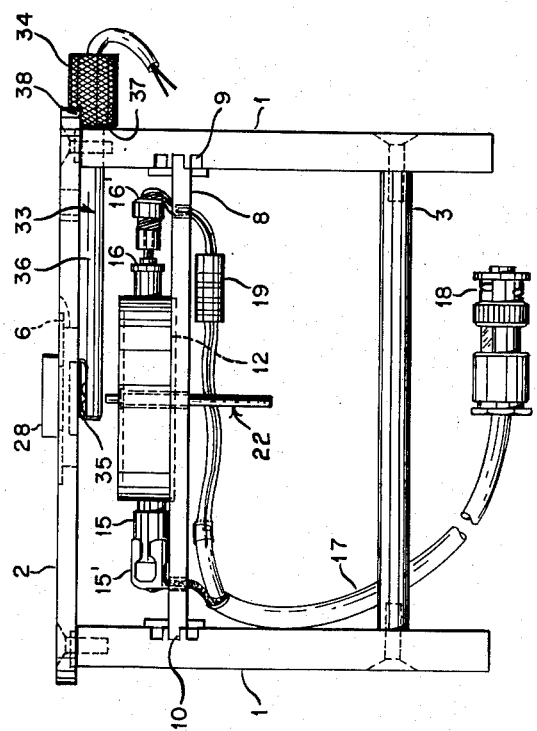
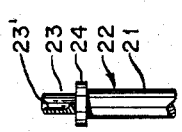
*INVENTORS*
BORIS B. JOFFE and
BY FREDERICK A. LUNDGREN
*Christel + Bean*
ATTORNEYS Dec. 24, 1963  B. B. JOFFE ETAL  3,115,577
MEASURING TABLE FOR USE IN COATING THICKNESS MEASURING
Filed May 3, 1962  2 Sheets-Sheet 2

INVENTORS
BORIS B. JOFFE and
FREDERICK A. LUNDGREN
BY
Christel + Bean
ATTORNEYS

United States Patent Office 3,115,577
Patented Dec. 24, 1963

3,115,577
MEASURING TABLE FOR USE IN COATING THICKNESS MEASURING
Boris B. Joffe, Buffalo, and Frederick A. Lundgren, Grand Island, N.Y., assignors to Twin City Testing Corp., Tonawanda, N.Y.,
Filed May 3, 1962, Ser. No. 192,118
20 Claims. (Cl. 250—58)

This invention relates generally to the support art, and more specifically to a new and useful table particularly adapted for use in conjunction with the measurement of coating thicknesses utilizing radiation techniques.

It is known that when beta rays hit a body, a certain portion of them are reflected. The intensity of the reflected beta rays is a function of the atomic number of the body. If the body is coated, the intensity of beta ray backscatter will be proportional to the thickness of the coating. Therefore, such beta ray backscatter can be used to measure the thickness of coatings, and this measurement technique offers many advantages, particularly in the measurement of ultra-thin coatings.

Accordingly, a primary object of this invention is to provide a measuring table particularly adapted for beta ray measurement techniques and having interchangeable object supporting platens having exposure openings of different sizes and shapes for receiving a wide variety of coating areas in a manner eliminating the area as a variable.

Another object of this invention is to provide a measuring table as aforesaid and having interchangeable source holders, together with means automatically centering the source holder and the counter tube with respect to the exposure opening.

Still another object of this invention is to provide a measuring table of the class described having means for adjusting the position of the source relative to the counter tube and the object being measured, and the counter tube and the source, together, relative to the object.

It is also an object of this invention to provide a measuring table for this purpose having means for supporting curved and irregularly shaped objects.

In one aspect thereof, a measuring table constructed in accordance with our invention is characterized by the provision of a top wall member having an opening therethrough, a slide member, a radiation counter tube carried by the slide member, guide means receiving the slide member in spaced relation to the top wall member and guiding the slide member into a position centering the counter tube relative to the top wall opening, and stop means precluding movement of the slide member beyond such centered position.

In another aspect thereof, a measuring table constructed in accordance with our invention is characterized by the provision of a top wall member having an opening therethrough, means supporting a radiation counter tube below the top wall member in alinement with its opening, a holder arm positioned over the top wall member and adapted adjacent one end to carry either a radiation source or a supporting stem, and means mounting the holder arm for positioning its one end over the top wall opening in alinement with the tube.

Figure 5:
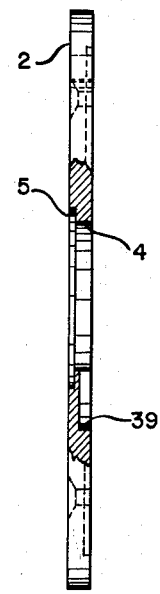
Figure 6:
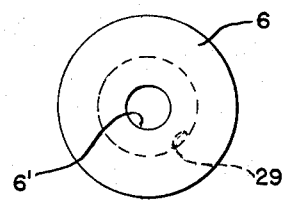
Figure 7:
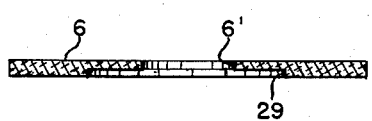
Figure 8:
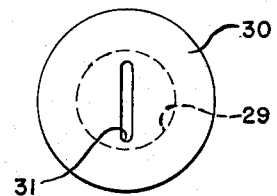
Figure 9:
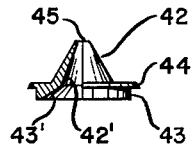

The foregoing and other objects, advantages and characterizing features of a measuring table constructed in accordance with our invention will become clearly apparent from the ensuing detailed description of a presently preferred embodiment thereof, considered in conjunction with the accompanying drawings wherein like reference numerals denote like parts throughout the various views and wherein:

FIG. 1 is a side elevational view of a completely assembled measuring table of our invention;
FIG. 2 is a fragmentary, side elevational view thereof, with a holder arm mounted thereon;
FIG. 3 is a view like FIG. 2, but with the radiation source carried by the holder arm;
FIG. 4 is a top plan view thereof, with the holder arm and supporting platen removed;
FIG. 5 is a view, partly in section and partly in end elevation, of the top wall of FIG. 4;
FIG. 6 is a top plan view of one platen;
FIG. 7 is a transverse sectional view thereof;
FIG. 8 is a top plan view of another platen;
FIG. 9 is a view, partly in side elevation and partly in longitudinal section, of an adapter useable with a platen such as shown in FIG. 6, for supporting an object as shown in FIG. 2; and
FIG. 10 is a fragmentary view, partly in elevation and partly in longitudinal section, of the radiation source holder.

Referring now in detail to the illustrative embodiment of our invention depicted in the accompanying drawings, there is shown a measuring table having opposite side walls 1, and a top wall 2 extending between side walls 1 and secured to the upper ends thereof. A supporting brace 3 extends between side walls 1, adjacent the lower ends thereof.

Top wall 2 has a relatively large, central opening 4 therethrough, surrounded by a recessed shoulder 5 which receives and supports a circular platen 6 in flush relation to the top wall 2. Platen 6 has an opening 6' therethrough, for exposure of the surface to be measured, and is interchangeable with other platens having different exposure openings as will be described. To this end, platen 6 slip-fits into place on shoulder 5, and top wall 2 and shoulder 5 have notches 7 and 7' respectively, to facilitate removal of the platen.

A slide member 8 extends between side walls 1, which latter are provided with guide means supporting the slide member in parallel, centered relation to top wall 2. In the illustrated embodiment, these guide means comprise paired, vertically spaced grooves 9 on the inner side surfaces of the side walls 1. Tongues 10 project from the opposite ends 11 of slide member 8, and are received in the side wall grooves 9. The slide member ends 11 have only sliding clearance with the inner sides of side walls 1, and tongues 10 have a snug, sliding fit in grooves 9, whereby slide member 8 is precisely positioned parallel to top wall 2.

The slide member 8 has a central, circular recess 12 which receives and centers a radiation counter tube 13 of the pancake type. Tube 13 has a window 14 in its top wall surface, and laterally projecting cathode and anode terminals 15 and 16. Cathode and anode connectors 15' and 16', respectively, are carried by slide 8 for connection to terminals 15 and 16, respectively. Wires 17 extend from connectors 15' and 16' to a plug 18, adapted for connection to an appropriate scaling unit not shown, such as the Betascope scaling unit manufactured by Twin City Testing Corporation of 533 S. Niagara Street, Tonawanda, New York. A series resistance 19 is interposed in the anode line.

Tube 13 has a support sleeve 20 extending centrally therethrough, for receiving the centering stem 21 of a radiation source holder 22. Tube 13 otherwise can be of a known type, such as one of the pancake tubes manufactured by Anton Electronic Laboratories, Inc., Brooklyn, New York, the functional details of which are known and require no description. A beta-emitting source cup 23 is provided at the upper end of holder 22, and a retainer ring 24 is carried by holder 22 intermediate source cup 23 and stem 21. Ring 24 bears against the upper end of sleeve 20, to support the source cup 23 above the tube 13. Slide member 8 is provided with a central opening 25, for passage of the holder stem 21.

The counter tube 12 and centering stem opening 25 are centered on slide member 8. Accordingly, when slide member 8 is inserted between side walls 1, grooves 9 will guide it to a centered position with tube 13 and source cup 23 in axial alinement with top wall opening 4. End stops 26 are provided on side walls 1, and limit inward movement of slide 8 to this centered position of recess 12 and opening 25 relative to the top wall opening 4. As a result: when tube 13 is slipped into recess 12, it is automatically centered on slide 8; when source holder 22 is slipped into sleeve 20, it is automatically centered in tube 13, and on slide 8; and when slide 8 is pushed into position against stops 26, both tube 13 and source cup 23 are automatically centered relative to top wall opening 4. This automatic centering of the counter tube and beta-emitting source in proper position for operation greatly facilitates the taking of measurements, and the substitution of source and tubes.

In use, the platen having the largest opening compatible with the measuring area available, is inserted in top wall 2. The object to be measured, shown at 28 in FIG. 1, is placed on the platen, over its opening 6'. The source most appropriate for the thickness being measured is slip-fitted into tube 13 on slide member 8, and the slide is slid along the appropriate set of grooves 9 against the stops 26. The appropriate readings then are taken, in a manner known in the art.

The platen 6 is recessed on its under surface, as indicated at 29, thereby making the central, object supporting portion of the platen as thin as possible. The thin central portion, against which the radiation is directed, reduces the amount of backscatter from the platen and thereby facilitates a more accurate reading of backscatter from the object 28 being measured. The substantially thicker, peripheral ring surrounding the thin central portion provides the platen with the necessary mechanical strength.

Platens 6 having openings 6' of different sizes are provided, as shown by platen 30 (FIG. 8) having a narrow slit 31 for an opening. By providing a number of interchangeable platens 6, 30, having circular openings of different diameter and slots of different width, a platen can be selected with an opening or window exposing only the coating to be measured. In other words, the exposure opening 6' or 31 is limited in area to the coating area which is available for measurement. In this way, the coating area under test is fixed, and is eliminated as a variable. This is extremely important, for accurate measuring, and its significance becomes particularly apparent when only selected portions of object 28 are coated, as in a printed circuit.

In the case of slit 31 or other such noncircular opening, it has been determined that the same must lie at right angles to the anode-cathode axis of tube 13. If it does not, interference with the electrical field of the tube results. Therefore, we provide top wall 2 with a line or other indicia 32, defining the axis at right angles to the anode-cathode axis of the tube. If platen 6 is removed from opening 4, and platen 30 substituted in its place, the indicia 32 facilitates alinement of slot 31 at right angles with the tube axis.

Also, when positioning the coating under test on the platen, it is often important to be able to see from below just what is exposed through the platen opening. This is accomplished by providing a light source 33 comprising an elongated tube having a head 34 at its outer end, and carrying a light source 35 opening laterally through the tube 36 at its inner end. The enlarged head 34 provides a first shoulder 37 (FIG. 1) which abuts the side wall of the table and thereby positions the light source centrally of the top wall opening 4. The tube 36 slip-fits through an opening in the side wall 1, which positions the tube just behind the center of opening 4. Head 34 is provided with another shoulder 38, which bears against the overhanging edge of top wall 2 and positions the light source 35 to be directed upwardly, at an acute angle. The light is reflected by the platen and the exposed area of the object under test downwardly and forwardly. By positioning a mirror, not shown, at the front of the table, below the level of top wall 2, the reflected image can be viewed, and the under surface of top wall 2 is recessed, as shown at 39, to provide a wider viewing angle for such a mirror.

The provision of vertically spaced sets of grooves 9 varies the spacing of counter tube 13 and source cup 23 from the object under test, and thereby varies the cone of reflection. In addition, centering stem 21 of source holder 22 is adapted to receive a spacing collar 40 (FIG. 2) for elevating source cup 23 above the window 14 of the tube 13. By providing interchangeable collars 40, of different lengths, the position of cup 23 relative to tube 13 can be varied as required, and this together with the height adjustment provided for slide 8 gives a complete range of adjustment to the measuring table. This is important, because smaller exposure openings require closer placement of the source. For ease of sliding, side walls 1 and slide 8 will be of dissimilar materials, such as plastic and metal, respectively.

For rounded and odd shaped articles, which cannot lie on a flat platen, an adapter is provided. For example, if it is desired to measure the thickness of the coating on ball bearing 41 shown in FIG. 2, the same is supported by an adapter 42. As shown in detail in FIG. 9, adapter 42 is cone shaped, and has an undercut base portion 43 adapted to slip-fit into opening 6' of platen 6, with a shoulder 44 bearing against the top of the platen, whereby adapter 42 is centered on the platen.

An object such as bearing 41 is placed on the open upper end 45 of the adapter 42, and is held in place thereon by a vertically adjustable holder stem 46 carried at one end of a holder arm 47 which extends across top wall 2 from a mounting stem 48. Stem 48 slip-fits through an opening in top wall 2, having a flange 50 bearing against top wall 2 and supporting arm 47 in its elevated position. Further, a centering pin 52 depends from flange 50, for slip-fitting into a centering opening 53 in top wall 2. Opening 53 and pin 52 are arranged so that, when they interfit, holder stem 46 is centered relative to top wall opening 4. An adjustable set screw 54 can be loosened, to raise and lower stem 46, and then tightened to hold the stem in adjusted position, the stem having a knurled knob 55 for convenient manipulation.

When using adapter 42, source cup 23 often will be positioned inside the adapter closely adjacent its opening 45. The interior of the adapter is cone shaped, as shown at 42' and 43', for beta ray reflection or backscatter around the source to the tube 13. The shape of the adapter, around opening 45, can be changed to accommodate and retain objects of different shapes, and it is contemplated that a number of interchangeable adapters, having different sizes and shapes of openings, will be provided.

In some instances, instead of measuring the intensity of backscatter, it will be desired to measure the intensity of rays passing through the material under test. In that instance, the source holder 22 is removed from tube 13, inverted, and slipped into the end of arm 47 in place of holder stem 46 which is removable. This is shown in FIG. 3, and the adjustable set screw 54 provides a convenient means for adjusting the elevation of the source cup 23 relative to the object under test.

Also of significance is the particular source holder 22, which, as pointed out above, provides a convenient means of centering and holding source cup 23, through the stem 21. The retaining ring not only holds the cup above window 14 of tube 13, but provides, with stem 21, a means for varying the elevation of the cup above the window by accommodating any one of various collars 40.

The source cup 23 has a cylindrical opening 23' which receives and retains the beta emitting source material, the cup acting as a shield against direct radiation to tube 13. The particular shape of the cup collimates the radiated beam, without creation of too much self-absorption, and therefore is of importance. Here again, it is contemplated that a number of interchangeable holders, containing different source material, will be provided.

Accordingly, it is seen that our invention fully accomplishes its intended objects. There is provided a measuring table of great flexibility, with interchangeable platens, adaptors and source holders, and with means supporting the source and tube for measuring either reflected or through radiation. At the same time, the parts are automatically centered. While we have shown in detail only one embodiment of our invention, that has been done by way of illustration only.

Having fully disclosed and completely described our invention, and its mode of operation, what we claim as new is:

1. A measuring table for use in conjunction with beta radiation measurements comprising, a wall member, means providing a restricted opening through said wall member, means for supporting an object to be measured across said opening, a slide member, a beta radiation detector having a radiation receiving window larger than said opening carried by said slide member, guide means receiving said slide member in spaced relation to said wall member and guiding said slide member for movement into and out of a predetermined position of said detector relative to said opening, and stop means precluding movement of said slide member inwardly beyond said position.

2. A measuring table for use in conjunction with beta radiation measurements comprising, a wall member, means providing a restricted opening through said wall member, means for supporting an object to be measured across said opening, a slide member, a beta radiation detector having a radiation receiving window larger than said opening carried by said slide member, and guide means receiving said slide member in spaced relation to said wall member and guiding said slide member into and out of a position alining said detector with said opening, said guide means comprising paired supporting shoulders engaging said slide member in supporting relation thereto, there being at least two pairs of said shoulders spaced apart in the direction of said opening for varying the spacing between said detector window and said opening.

3. A measuring table for use in conjunction with beta radiation measurements comprising, a wall member, means providing a restricted opening through said wall member, means for supporting an object to be measured across said opening, a slide member, a beta radiation source holder carried by said slide member, guide means receiving said slide member in spaced relation to said wall member and guiding said slide member for movement into and out of alinement of said source holder relative to said opening, and stop means precluding movement of said slide member inwardly beyond a predetermined position of alinement of said source holder relative to said opening.

4. A measuring table for use in conjunction with beta radiation measurements comprising, a wall member having an opening therethrough, means supporting a beta radiation detector on one side of said wall member in alinement with said opening, a peripheral shoulder recessed in the other side of said wall member around said opening, and a removable platen seated on said shoulder, said platen having an opening therethrough smaller than said wall opening and supporting an object to be measured across said platen opening.

5. A measuring table as set forth in claim 4, together with a hollow conical adapter carried by said platen and having an opening therethrough in alinement with said platen opening, said adapter supporting an object to be measured across said adapter opening.

6. A measuring table for use in conjunction with beta radiation measurements comprising, a wall member having an opening therethrough, means supporting a beta radiation detector on one side of said wall member in alinement with said opening, means for supporting an object to be measured across said opening, a holder arm on the other side of said wall member, a holder stem carried by said holder arm for holding an object in place across said opening, and means mounting said holder arm for movement into and out of a predetermined position of said holder stem relative to said opening.

7. A measuring table as set forth in claim 6, wherein said holder stem is removable from said arm for replacement by a beta radiation source carried by said arm.

8. A measuring table adapted for use in conjunction with the measurement of thicknesses utilizing beta radiation techniques comprising, a wall member having an opening therethrough, a removable platen for supporting an object to be measured, means positioning said platen on said wall member is a predetermined position with respect to said opening, said platen having an exposure opening therethrough smaller than said wall member opening and being removable for replacement by another platen having a different exposure opening, said platen having an object supporting surface receiving the object in physical contact therewith around said exposure opening, means for supporting a beta radiation detector in alinement with said exposure opening, and means for supporting a beta radiation source in alinement with said exposure opening.

9. A measuring table adapted for use in conjunction with the measurement of coating thicknesses utilizing beta radiation techniques comprising, means providing an exposure opening and arranged to support an object to be measured across said exposure opening, a beta radiation detector having a radiation receiving window, means supporting said detector with said window spaced from said object support means in alinement with said exposure opening, a beta radiation source holder, and means supporting said source holder on said detector in the space between said detector window and said object support means in alinement with said exposure opening.

10. A measuring table adapted for use in conjunction with the measurement of thicknesses utilizing beta radiation techniques comprising, means providing an exposure opening and arranged to support an object to be measured across said exposure opening, a beta radiation detector having an opening therethrough, means supporting said detector in alinement with said exposure opening, a beta radiation source holder extending through said detector opening and being guided thereby, and means supporting said source holder in position in the space between said detector and said object support means.

11. Measuring apparatus adapted for use in conjunction with the measurement of thicknesses utilizing beta radiation techniques comprising, a beta radiation detector having a radiation receiving window, a platen having an exposure opening therethrough smaller than said detector window, means positioning said platen with said opening in predetermined relation to said detector window, said platen supporting an object placed across said opening and being removable from said positioning means for replacement by another platen having a different exposure opening, and means for supporting a beta radiation source in alinement with said opening.

12. A measuring table as set forth in claim 1, together with a beta radiation source holder carried by said slide member in predetermined relation to said detector.

13. A measuring table as set forth in claim 9, wherein said detector has an opening therethrough and means providing a supporting shoulder adjacent said detector opening, and wherein said source holder comprises a cup for radioactive material, a retaining shoulder engaging said supporting shoulder and supporting said cup on said detector, and a stem extending through said detector opening.

14. A measuring table as set forth in claim 13, together with a removable collar on said stem between said retaining shoulder and said supporting shoulder for positioning said cup closer to said object support means.

15. A measuring table as set forth in claim 2, wherein said detector has an opening therethrough and means providing a supporting shoulder adjacent said opening, together with a beta radiation source comprising a cup for radioactive material, a retaining shoulder, and a centering stem extending from said retaining shoulder through said opening, and a removable spacing collar around said stem between said retaining and supporting shoulders.

16. A measuring table as set forth in claim 10, wherein said source holder supporting means are adjustable to vary the position of said source holder relative to said detector.

17. A measuring table as set forth in claim 10, wherein said detector supporting means are adjustable to vary the position of said detector and said holder as a unit relative to said object support means.

18. A measuring table as set forth in claim 10, said holder having a stem extending through said detector opening and a radioactive material cup supported between said detector and said object support means.

19. A measuring table as set forth in claim 10, wherein said radiation source holder comprises a stem and a source cup at one end thereof, said stem extending through said central opening and said source cup being positioned in the space between said detector and said object support means, said source cup having a cylindrical opening for receiving radiation emitting material.

20. A measuring table adapted for use in conjunction with the measurement of coating thicknesses utilizing beta radiation techniques comprising, a wall member having an opening therethrough, means for supporting an object to be measured on one side of said wall member across said opening, means for supporting a beta radiation detector on the opposite side of said wall member in alignment with said opening, illuminating means positioned on the same side of said wall member as said detector and arranged to illuminate a supported object through said opening, and means for supporting a beta radiation source in alignment with said opening.

References Cited in the file of this patent

UNITED STATES PATENTS

| | | |
|---|---|---|
| 2,509,808 | Cerniglia | May 30, 1950 |
| 2,680,199 | Abel | June 1, 1954 |
| 2,858,450 | Holben | Oct. 28, 1958 |
| 2,884,535 | Swift | Apr. 28, 1959 |
| 2,899,582 | Hermsen et al. | Aug. 11, 1959 |
| 2,951,162 | Stein | Aug. 30, 1960 |
| 2,964,631 | Foster | Dec. 13, 1960 |
| 3,056,027 | Martinelli | Sept. 25, 1962 |